March 14, 1944.  F. G. CORNELL, JR  2,343,886
DAIRY PRODUCT DEODORIZER
Filed July 30, 1941  4 Sheets-Sheet 1
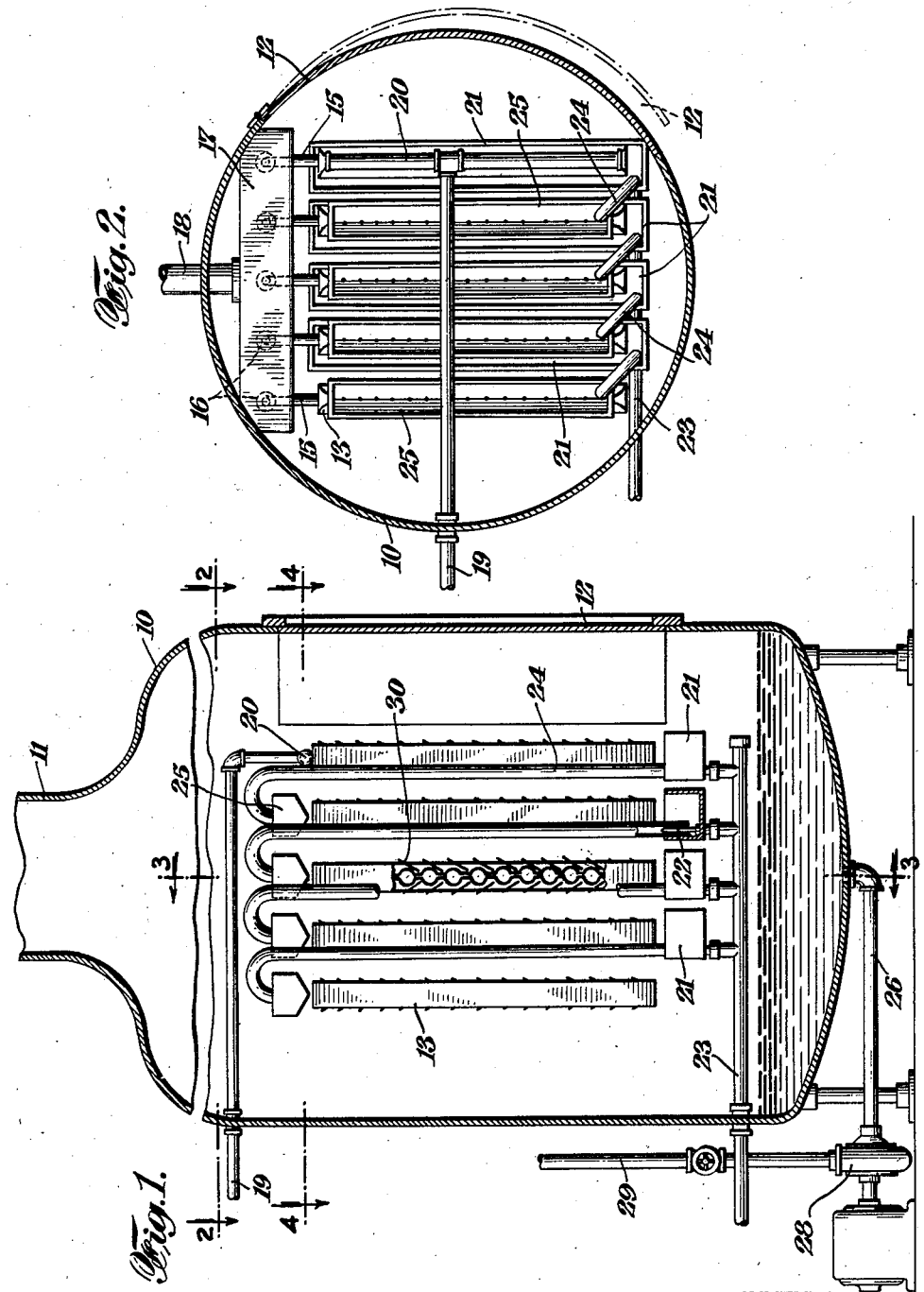
INVENTOR
Fritz G. Cornell, Jr
BY Kenyon & Kenyon
ATTORNEYS.

March 14, 1944. F. G. CORNELL, JR 2,343,886
DAIRY PRODUCT DEODORIZER
Filed July 30, 1941 4 Sheets-Sheet 2
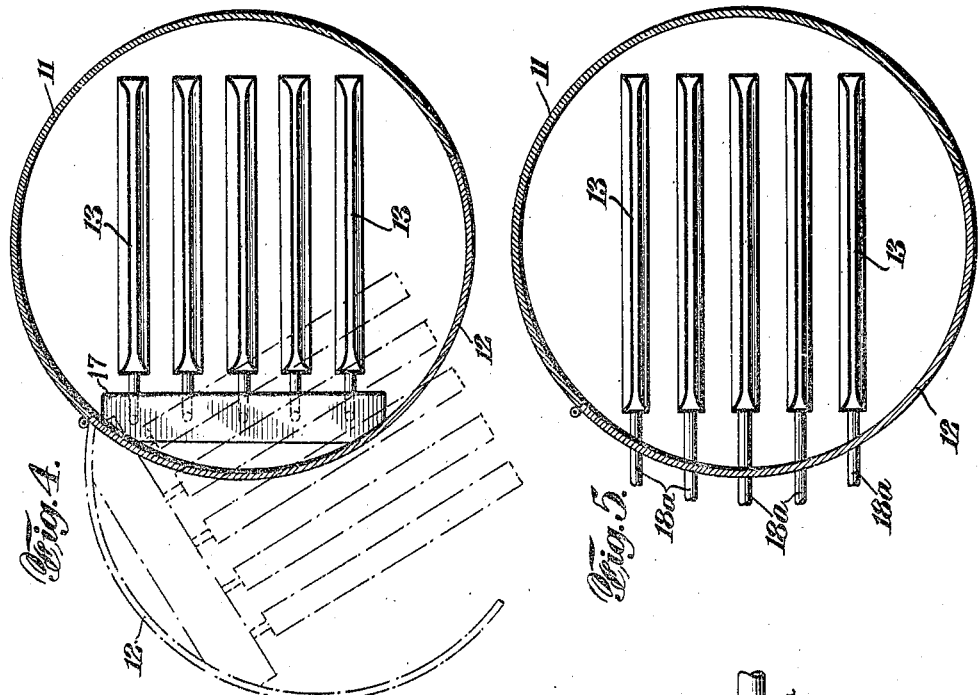
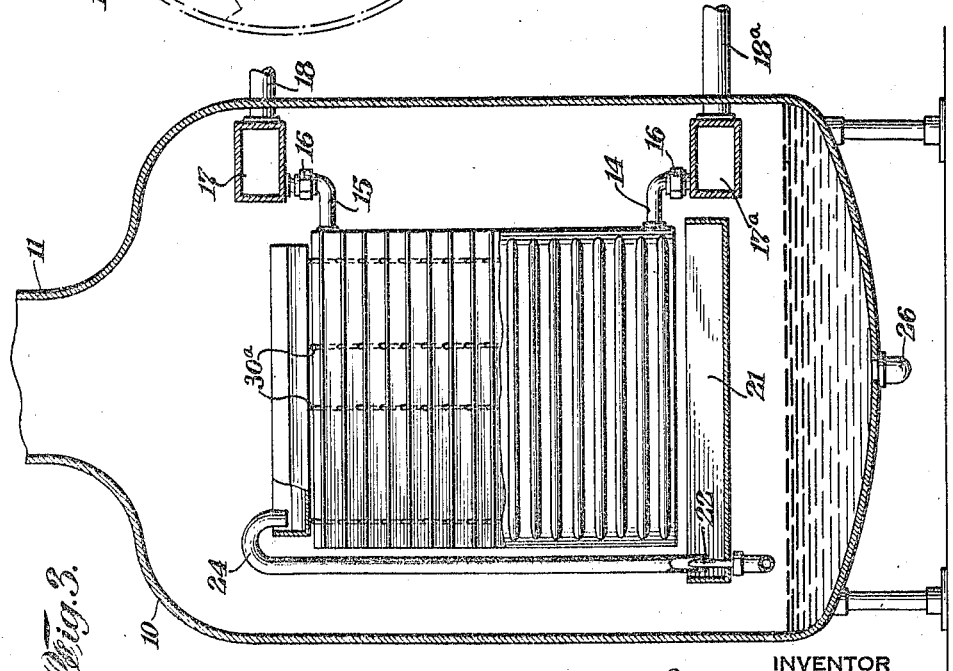
INVENTOR
Fritz G. Cornell, Jr
BY
Kenyon & Kenyon
ATTORNEYS

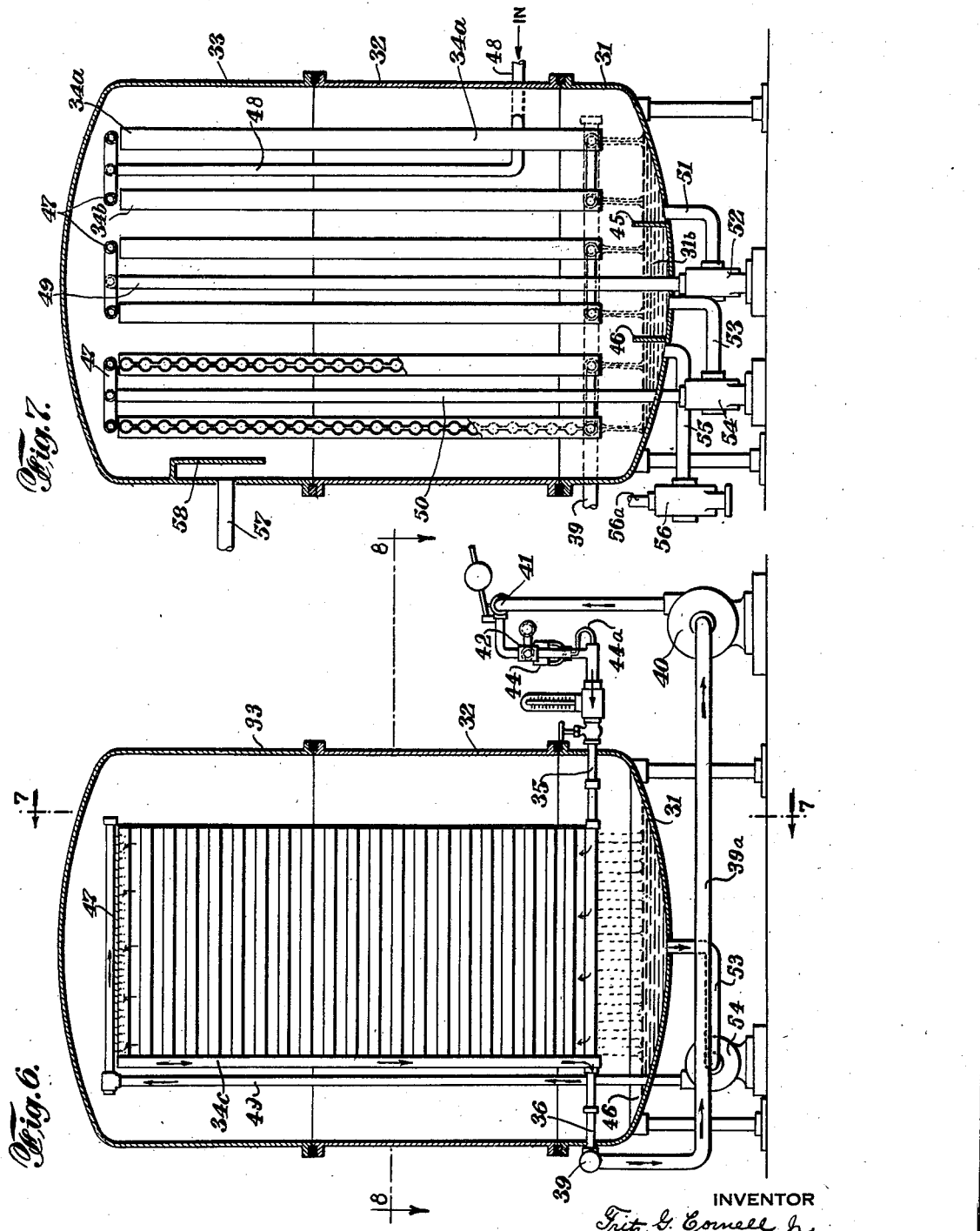

March 14, 1944. F. G. CORNELL, JR 2,343,886
DAIRY PRODUCT DEODORIZER
Filed July 30, 1941 4 Sheets-Sheet 4
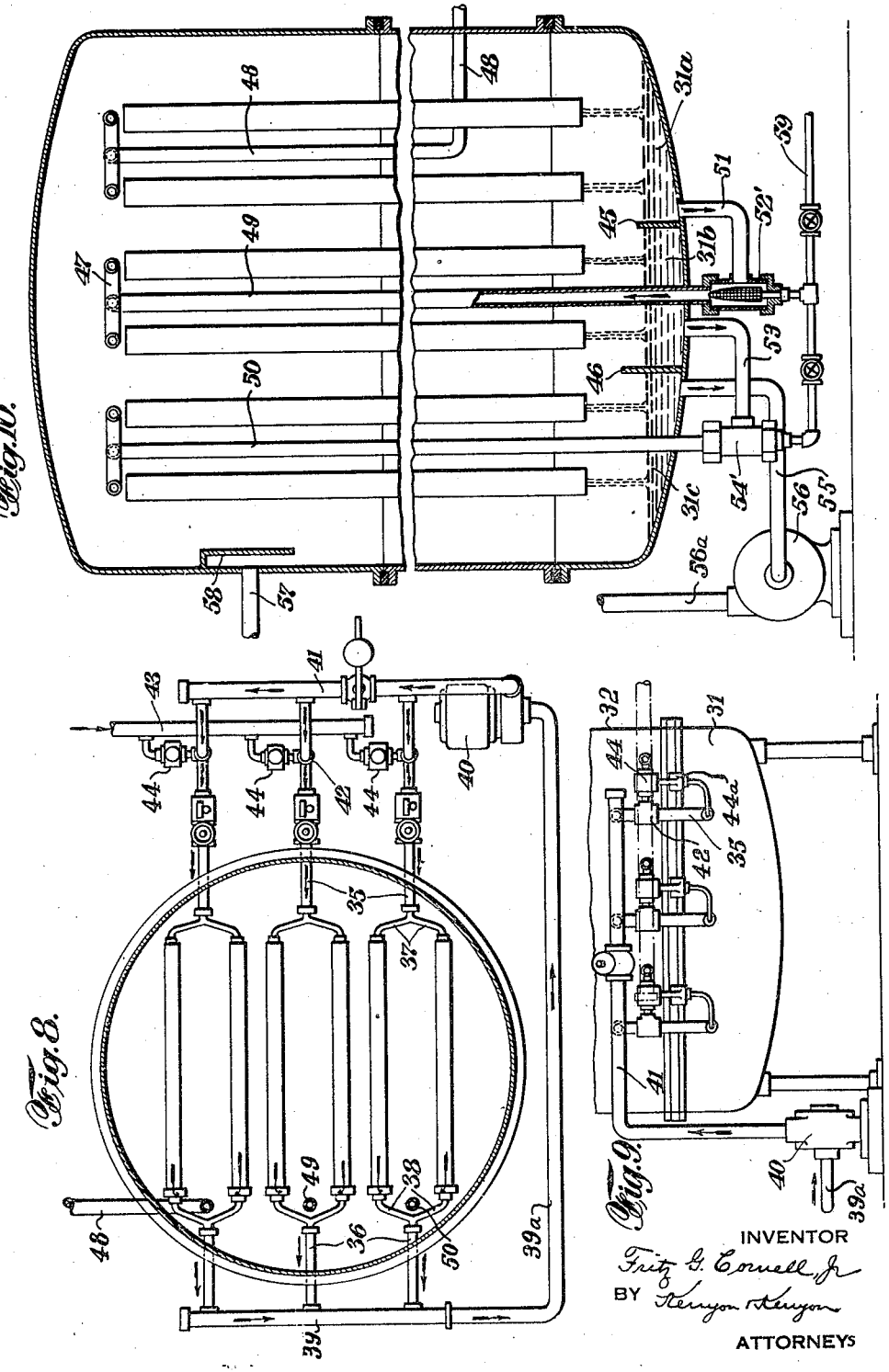

Patented Mar. 14, 1944

2,343,886

UNITED STATES PATENT OFFICE 2,343,886

DAIRY PRODUCT DEODORIZER

Fritz G. Cornell, Jr., Mountain Lakes, N. J.

Application July 30, 1941, Serial No. 404,642

14 Claims. (Cl. 31—2)

This invention relates to dairy product deodorizers and more especially to a cream deodorizer embodying a heat exchanger for heating the cream in the process of deodorization.

An object of this invention is a cream deodorizer having a large heat exchange surface within a small space and being capable of removing odorous ingredients from cream or the like thoroughly and effectively and at a high rate.

In one form of deodorizer embodying this invention, there is provided a chamber containing one or more vertical heat exchange units and means are provided for maintaining the chamber at any desired degree of vacuum. The dairy product to be deodorized is supplied to the top of the heat exchange unit and is caused to flow downwardly over the surface thereof. Hot liquid is supplied to each heat exchange unit and is caused to flow therethrough to effect progressive heating of the dairy product.

In a multiple unit device, means are provided for lifting the liquid discharged from the bottom of one heat exchange unit to the top of the succeeding heat exchange unit, thereby causing the liquid to pass successively over several heat exchange units. Steam may be added to the dairy product to be deodorized after such dairy product has been introduced into the container for the purpose of facilitating the removal of the odorous ingredients and when steam is used, it preferably is introduced into the liquid between passages over the heat exchange units and is used as the means for lifting the liquid discharged from the bottom of one heat exchange unit to the top of the succeeding heat exchange unit. Also in a multiple unit device, the heat exchange units may be mounted in side by side relation for swinging movement from said side by side relation into positions in which the surfaces of the heat exchange units are accessible for cleaning.

The dairy product is exposed to the full effect of the vacuum in said chamber during its entire course of flow over the exterior surface of a heat exchanger and is progressively raised to successively higher temperatures at which different odorous ingredients in the dairy product become volatilized. In view of the fact that the dairy product is at all times exposed to the vacuum in the chamber, the odorous flavors may be removed from the dairy product immediately upon becoming volatilizable and before such flavors have an opportunity to become fixed in the dairy product as a result of the action of heat. By using a type of heat exchanger having horizontally arranged flow retarding means, such, for example, as undulations in the surface of the exchanger, the dairy product is repeatedly cooled by the action of the vacuum and reheated during its entire downward flow over the surface of the heat exchanger to a point of producing optimum volatilization of the removable odorous ingredients.

In the event that high temperature liquid is passed through the heat exchange units, liquid may be forced off therefrom by ebullition. For this reason, means preferably in the form of louvers are provided for returning to each heat exchange unit liquid forced off therefrom by ebullition so that there is a continuous uniform flow of liquid over each heat exchange unit.

The apparatus of this invention may be used in the processing of dairy products containing different odorous flavors and combinations thereof by suitable adjustment of the degree of vacuum and the temperature of the heating liquid. The apparatus takes advantage of the well-known physical law that the temperature of evaporation is dependent upon the degree of vacuum. Therefore, in treating dairy products containing undesirable odorous ingredients the degree of vacuum may be lowered to permit high temperature treatment of the dairy product. The temperature of the heating liquid is correspondingly adjusted. As illustrative of one condition of operation of the apparatus for the deodorization of cream, the cream to be deodorized is supplied to the device at a temperature of 110° F. and the chamber is maintained at fifteen inches of mercury vacuum. Heating fluid is supplied to the heat exchange units of proper temperature and proper ratio of flow to heat the dairy product to the ultimate temperature of pasteurization by the time it reaches the bottom end of the heat exchanger.

In addition to effecting deodorization of liquid dairy products, the apparatus of this invention also effects considerable concentration of butter fat. As a result, cream coming from such apparatus may contain an increase of as much as 20% to 25% butter fat with the result that the ripening capacity is increased in that same proportion as well as the churning capacity.

Other objects, novel features and advantages of this invention will become apparent from the following specification and accompanying drawings, wherein:

Fig. 1 is a vertical section through a deodorizer embodying the invention;

Fig. 2 is a section on the line 2—2 of Fig. 1;

Fig. 3 is a section on the line 3—3 of Fig. 1;

Figs. 4 and 5 are sections on the line 4—4 of Fig. 1 of modifications;

Fig. 6 is a view similar to Fig. 1 of a further modification;

Fig. 7 is a section on the line 7—7 of Fig. 6;

Fig. 8 is a section on the line 8—8 of Fig. 6;

Fig. 9 is a fragmentary end view of Fig. 6, and

Fig. 10 is a view similar to Fig. 7 of a still further modification.

Referring now more especially to Figs. 1 to 3 inclusive, 10 is a substantially cylindrical container having a conduit 11 leading from the top thereof to vacuum-producing means (not shown), by means of which any desired degree of vacuum may be maintained within the container 10. Access is had to the interior of the container through a doorway for which is provided a door 12 of suitable construction to seal the doorway when closed. Within the container are arranged a plurality of heat exchangers 13, the number of which may be varied according to the results desired and five being shown herein for illustrative purposes. The heat exchangers may be of any suitable structure, but are herein illustrated by way of example only as being of the type having horizontal channels through which heating fluid flows in series and for illustrative purposes are here shown as being composed of two contacting metal plates having horizontal offset portions co-operating to form the channels for the attemperating fluid.

Each heat exchange unit is provided with inlet and outlet pipes 14 and 15 respectively, by means of which heating fluid is circulated upwardly through such unit. By means of suitable swivel connections 16, the pipes 14 and 15 are connected to supply and discharge headers 17a and 17 respectively. Each of the heat exchange units is thus mounted for swinging movement by means of connections through which the attemperating fluid is supplied to and discharged from such units. Normally, the heat exchanger units are in the parallel spaced relation shown in Fig. 2, but the arrangement is such that the heat exchange units may be swung into positions in which they are accessible for cleaning.

Heating fluid is supplied to and discharged from the headers 17 and 17a by pipes 18 and 18a which extend through the wall of the container. Cream or other liquid to be deodorized is introduced into the container through the pipe 19 and is delivered to a distributor pipe 20 overlying the top edge of one heat exchange unit 13, the pipe 20 being provided with a series of apertures, by means of which the liquid to be treated is distributed uniformly over the entire length of the heat exchange unit. Directly beneath each heat exchange unit 13, except the last, is provided a collecting trough 21 and into each trough extends a nozzle 22 connected to a pipe 23 leading from the source of steam. A conduit 24 extends upwardly from each trough 21 and connects with the nozzle 22.

Directly above each heat exchange unit 13, except the first, is arranged a distributing trough 25 into which the upper end of the conduit 24 discharges. Each trough 25 is arranged to distribute liquid therefrom uniformly over the top of the associated heat exchanger. Deodorized liquid is removed from the bottom of the container through the pipe 26 and by means of a pump 28 is delivered through the pipe 29 to a suitable collecting tank.

The liquid collected in each trough 21 is carried upwardly through the conduit 24 by steam introduced through the nozzle 22, thereby effecting thorough admixture of the steam with the liquid and such mixture is discharged into the trough 25. The mixture of steam with the liquid promotes vaporization of the odorous constituents of the liquid, such constituents being removed from the container in vapor form through the conduit 11. Such use of steam in the deodorization of cream is fully set forth in the patent to Cornell, No. 2,025,196 issued December 24, 1935. While steam preferably is used for the purpose of transporting liquid from a trough 21 to the succeeding trough 25, it is contemplated that other means may be used for such purpose.

Under the normal temperatures and pressures at which deodorization is effected, active ebullition of the volatilizable undesirable flavors within the liquid passing over the heat exchange units is produced. In order to return to the heat exchanger any liquid particles forced off by ebullition, each heat exchange unit is equipped with two sets of horizontal louvers 30 which are arranged to slant inwardly and downwardly so that the lower edge of each louver preferably is approximately in alinement with one horizontal channel of the unit and the upper edge preferably is approximately in alinement with the higher horizontal channel. These louvers are supported from the heat exchanger units by rods or the like 30a which are bent inwardly at their upper ends to overlie the top of the heat exchanger so that they are easily and quickly removable therefrom when it is desired to clean the unit. The louvers intercept flying particles of liquid and return the same to the heat exchangers as well as provide paths for the escape of steam and vapor from the liquid so that there is no interference with the free flow of liquid over the heat exchange surface. Also, the return of the liquid under treatment to the heat exchange surface results in maintaining such surface at relatively uniform temperature.

As illustrated in Fig. 4, the headers 17 and 17a may be supported by the door 12 so that by swinging the door into the dotted line position, the heat exchange units will be swung completely exterior of the casing, thus rendering the same more easily accessible for cleaning. After having been removed from the container by opening of the door, the heat exchange units may then be swung on their supports to space them apart for cleaning purposes.

In Fig. 5 is illustrated a modification in which separate supply and discharge pipes 18 and 18a are provided for each heat exchange unit 13, thereby making it possible to supply different temperature liquids to heat exchange units. With this arrangement, the dairy product to be deodorized may be subjected in a single apparatus to different temperatures at different stages of deodorization, thus accomplishing the same effect in one deodorizer that heretofore has been possible to accomplish only by use of separate deodorization chambers.

In the modification illustrated in Figs. 6 to 9, the container is composed of a base section 31, a ring section 32 and a dome section 33, which are interjoined by suitable sealing means of such nature that the dome and ring sections may be disassembled from the base section for cleaning purposes.

In the container are provided a plurality of heat exchange units, each unit being composed of two sections 34a and 34b. The heat exchanger sections may be of any suitable structure but are herein illustrated by way of example only as being of the type having horizontal channels through which heating fluid flows in series and for illustration purposes are shown as being composed of two contacting metal plates having horizontal offset portions co-operating to form the channels for the heating liquid. The exchangers are supported by supply pipes 35 and discharge pipes 36 extending through the wall of the base portion 31. The supply and discharge pipes have branches 37 and 38 respectively communicating with the sections 34a and 34b. The sections are so constructed that the heating liquid passes upwardly through the horizontal channels in series and from the top channel is conducted by an interior passageway 34c to a branch 38. The discharge pipes 36 communicate through a header 39 and pipe 39a with the inlet of a pump 40, the outlet of which communicates through a header 41 with the pipes 35. In each pipe 35 is provided a mixing T 42 through which steam is supplied from a pipe 43. Also, in each pipe 35 is provided the temperature-responsive element of a thermostat 44a controlling a valve 44 which regulates the amount of steam supplied to the pipe 35.

The base portion 31 is provided with two partitions 45 and 46 dividing it into three compartments 31a, 31b and 31c, each of which is located directly under one heat exchanger. Above each heat exchanger is provided a distributor 47 arranged to supply liquid to the top of each section. A pipe 48 leads through the wall of the ring member 32 and communicates with the distributor 47 of the rightmost heat exchanger 34. A pipe 49 leading through the bottom of the base member 31 communicates with the distributor of the middle heat exchanger 34 while a pipe 50 also leading through the bottom of the base member 31 communicates with the distributor 47 of the leftmost heat exchanger 34. A pipe 51 leads from the compartment 31a to the inlet of a pump 52, the outlet of which communicates with the pipe 49. A pipe 53 leads from the compartment 31b to the inlet of a pump 54, the outlet of which communicates with the pipe 50. A pipe 55 leads from the compartment 31c to the inlet of a pump 56.

A pipe 57 leads from the upper portion of the container to a vacuum source (not shown). Preferably, a baffle plate 58 is provided in the container in overlying relation to the pipe 57.

In the operation of this modification, liquid dairy product is pumped through the pipe 48 to the rightmost distributor 47 and flows downwardly over the surface of the two sections of the rightmost heat exchanger 34. When the liquid reaches the bottom of the heat exchanger, it falls into the compartment 31a from which it is withdrawn by the pump 52 and supplied through the pipe 49 through the center distributor. From the distributor, the dairy product flows downwardly over the outer surface of the two heat exchanger sections and falls into the compartment 31b. From this compartment, the dairy product is withdrawn through the pipe 53 by the pump 54 and is supplied through the pipe 50 to the leftmost distributor 47. Again, the liquid product flows downwardly over the outer surface of the sections of the heat exchanger and after collection in the compartment 31c is withdrawn through the pipe 55 by the pump 56 and delivered through a pipe 56a to a suitable storage tank or the like (not shown). Heating liquid is circulated through each exchanger from the pump 40 through the medium of the pipes 35 and is returned from the heat exchangers through the pipes 36 to the pump 40. The temperature of the heating liquid is regulated through the action of the thermostats 44a. The volatilized odorous ingredients are removed from the dairy product by reason of the vacuum condition existing in the container and are withdrawn from the container through the pipe 57.

In the modification illustrated in Fig. 10, the pumps 52 and 54 are replaced by steam injectors 52' and 54' to which steam is supplied through the pipe 59. The steam injectors 52' and 54' act in the same manner as the steam injectors 22 of the first modification to withdraw the dairy product from the two base compartments and supply it to the distributor 47. The steam, in addition to serving as the means for delivering the dairy product to the distributors 47 also serves to promote the deodorizing operation as previously pointed out.

Preferably the heat exchange units are of the construction illustrated in Cornell Patent No. 2,120,797, issued December 24, 1935, but it is contemplated that other suitable forms of heat exchangers may be used. Also, it is to be understood that various modifications may be made in the apparatus above described without in any way departing from the spirit of the invention as defined in the appended claims.

This application is a continuation-in-part of Cornell application, Serial No. 254,365, filed February 3, 1939, now abandoned, the latter application in turn being a continuation-in-part of Cornell application, Serial No. 227,641, filed August 31, 1938, and which is now Patent No. 2,247,152, dated June 24, 1941.

I claim:

1. A dairy product deodorizing device comprising a single container, means for maintaining vacuum in said container, two or more heat exchangers positioned in series in said container and extending between different levels, means for circulating attemperating fluid through the interior of said exchangers, means for supplying liquid dairy product to the exterior of the top of one exchanger, and means associated with all but one of said exchangers for collecting liquid discharged therefrom and delivering the same to the top of another exchanger, a portion of the container being the means for receiving the liquid dairy product from said one heat exchanger.

2. A device according to claim 1 characterized by superposed horizontal louvers on each side of each exchanger, said louvers being closer to the exchangers at their lower edges than at their upper edges, and means detachably supporting said louvers in operative relation to said heat exchangers.

3. A dairy product deodorizing device comprising a single container, means for maintaining vacuum in said container, two or more heat exchangers in said container extending between different levels, means for circulating attemperating fluid through said exchangers, means for supplying liquid dairy product to the top of one exchanger, means including one or more steam injectors each associated with only one exchanger for collecting liquid discharged therefrom and delivering a mixture of steam and dairy product to another exchanger, and means for supplying steam to each said injector.

4. A device according to claim 3 characterized by superposed horizontal louvers on each side of each exchanger, said louvers being closer to the exchangers at their lower edges than at their upper edges, and means detachably supporting said louvers in operative relation to said heat exchangers.

5. A dairy product deodorizing device comprising a single container, means for maintaining vacuum in said container, two or more heat exchangers in said container extending between different levels, means individual to each heat exchanger for circulating attemperating fluid therethrough, means for supplying liquid dairy product to the top of one exchanger, means including one or more steam injectors each associated with only one exchanger for collecting liquid discharged therefrom and delivering a mixture of steam and dairy product to another exchanger, and means for supplying steam to each said injector.

6. A device according to claim 5 characterized by superposed horizontal louvers on each side of each exchanger, said louvers being closer to the exchangers at their lower edges than at their upper edges, and means detachably supporting said louvers in operative relation to said heat exchangers.

7. A dairy product deodorizing device comprising a container, means for maintaining vacuum in said container, a heat exchanger in said container extending between different levels, means for circulating attemperating fluid through the interior of said exchanger, means for supplying liquid dairy product to the exterior of the top of said exchanger whereby said dairy product is exposed to the full effect of the vacuum in said chamber during its entire course of flow over the exterior surface of the heat exchanger to effect removal of the volatilizable odorous ingredients of the dairy product immediately upon such ingredients becoming volatilized thereby progressively decreasing the percentage of odorous ingredients in the dairy product during its downward flow, and means for withdrawing liquid from said container, the attemperating fluid being always circulated in a direction substantially upwardly and oppositely to the direction of liquid dairy product flow.

8. A dairy product deodorizing device comprising a container, means for maintaining vacuum in said container, a heat exchanger in said container extending between different levels and provided with flow-retarding means, means for circulating attemperating fluid through the interior of said exchanger, means for supplying dairy product to the exterior of the top of said exchanger whereby said dairy product is exposed to the full effect of the vacuum in said chamber during its entire course of flow over the exterior surface of the heat exchanger to effect removal of the volatilizable odorous ingredients of the dairy product immediately upon said ingredients becoming volatilized and the dairy product is immediately and repeatedly reheated as exposed and cooled by the vacuum in said container during its entire down flow over the exterior surface of the heat exchanger to a point of producing optimum volatilization of the removable ingredients therefrom thereby effecting maximum removal of volatilizable ingredients and progressively decreasing the percentage of odorous ingredients in the dairy product during its downward flow, the attemperating fluid being always circulated in a direction substantially upwardly and oppositely to the direction of liquid dairy product flow.

9. A dairy product deodorizing device comprising a single container, means for maintaining vacuum in said container, two or more heat exchangers positioned in series in said container and extending between different levels, means for circulating attemperating fluid through the interior of said exchangers, means for supplying liquid dairy product to the exterior of the top of one exchanger, collecting means within said container below each exchanger and means associated with all but one of said collectors for delivering liquid therefrom to the top of another exchanger.

10. A dairy product deodorizing device comprising a single container, means for maintaining vacuum in said container, two or more heat exchangers positioned in series in said container and extending between different levels, means for circulating attemperating fluid through the interior of said exchangers, means for supplying liquid dairy product to the exterior of the top of one exchanger, partitions dividing the bottom of said container into compartments with a compartment located below each heat exchanger, and means associated with all but one of said compartments for delivering liquid therefrom to the top of a heat exchanger.

11. A dairy product deodorizing device comprising a single container, means for maintaining vacuum in said container, two or more heat exchangers positioned in series in said container and extending between different levels, means for circulating attemperating fluid through the interior of said exchangers, means for supplying liquid dairy product to the exterior of the top of one exchanger, and means including pumps associated with all but one of said exchangers for collecting liquid discharged therefrom and delivering the same to the top of another exchanger.

12. A dairy product deodorizing device comprising a single container, means for maintaining vacuum in said container, two or more heat exchangers positioned in series in said container and extending between different levels, means for circulating attemperating fluid through the interior of said exchangers, means for supplying liquid dairy product to the exterior of the top of one exchanger, partitions dividing the bottom of said container into three compartments with a compartment located below each heat exchanger, pumps for delivering liquid from all but one of said compartments to the top of a heat exchanger, and means for withdrawing liquid dairy product from said one compartment.

13. A dairy product deodorizing device comprising a single container, means for maintaining vacuum in said container, two or more heat exchangers in said container extending between different levels, means for circulating attemperating fluid through said exchangers, means for supplying liquid dairy product to the top of one exchanger, partitions dividing the bottom of said container into compartments with a compartment beneath each heat exchanger, means including one or more steam injectors each associated with only one compartment for delivering a mixture of steam and liquid dairy product to a heat exchanger, means for supplying steam to each said injector, and means for withdrawing liquid dairy product from said one compartment.

14. A dairy product deodorizing device comprising a container, means for maintaining vacuum in said container, a heat exchanger in said container extending between different levels, means for supplying liquid dairy product to the exterior of the top of said exchanger whereby said dairy product is exposed to the full effect of the vacuum in said container during its entire course of flow over the exterior surface of the heat exchanger to effect removal of the volatilized odorous ingredients of the dairy product immediately upon such ingredients becoming volatilized, thereby progressively decreasing the percentage of odorous ingredients in the dairy product during its downward flow, means for withdrawing liquid from said container, and means for circulating attemperating fluid through the interior of said exchanger to progressively heat said product as it flows downwardly over said exchanger.

FRITZ G. CORNELL, Jr.